(12) United States Patent
Supanc et al.

(10) Patent No.: US 8,932,122 B2
(45) Date of Patent: *Jan. 13, 2015

(54) EVALUATION AND RECTIFICATION SYSTEM

(71) Applicant: Pearson Education, Inc., Upper Saddle River, NJ (US)

(72) Inventors: Patrick M. Supanc, Boston, MA (US); Pedro Martello, Boston, MA (US); James Mills, Boston, MA (US); Johann A. Larusson, Waltham, MA (US); Robyn L. Lewis, Boston, MA (US); James A. Farley, Walnut Creek, CA (US)

(73) Assignee: Pearson Education, Inc., Upper Saddle River, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/305,478

(22) Filed: Jun. 16, 2014

(65) Prior Publication Data

US 2014/0295957 A1 Oct. 2, 2014

Related U.S. Application Data

(63) Continuation of application No. 14/103,576, filed on Dec. 11, 2013, now Pat. No. 8,753,200.

(60) Provisional application No. 61/759,902, filed on Feb. 1, 2013.

(51) Int. Cl.
*G07F 17/32* (2006.01)
*A63F 13/10* (2006.01)
*A63F 13/00* (2014.01)

(52) U.S. Cl.
CPC ............ *A63F 13/00* (2013.01); *G07F 17/3237* (2013.01)
USPC ............... 463/12; 463/13; 463/29; 273/149 R

(58) Field of Classification Search
USPC .......................................... 463/2, 25, 29, 42
See application file for complete search history.

(56) References Cited

U.S. PATENT DOCUMENTS

| | | | |
|---|---|---|---|
| 8,753,200 B1 | 6/2014 | Supanc et al. | |
| 2009/0075709 A1* | 3/2009 | Park | 463/2 |

* cited by examiner

*Primary Examiner* — Pierre E Elisca
(74) *Attorney, Agent, or Firm* — Kilpatrick Townsend & Stockton LLP

(57) ABSTRACT

Methods for customizing an educational experience of a gamer are provided. The method can include the generating of learning DNA which can include information relating to the gamer. The learning DNA can be generated by the aggregation of data received from the gamer, collected from other data sources, and generated based on the interaction of the user with an evaluation and rectification system. The method can further include selecting a mission for a user based on the learning DNA and/or information relating to the user.

19 Claims, 11 Drawing Sheets

EVALUATION AND RECTIFICATION SYSTEM

CROSS-REFERENCES TO RELATED APPLICATIONS

This patent application is a continuation of U.S. patent application Ser. No. 14/103,576, filed on Dec. 11, 2013, now U.S. Pat. No. 8,753,200, issued on Jun. 17, 2014 and entitled "Evaluation and Rectification System," which claims the benefit of U.S. Provisional Application No. 61/759,902, filed on Feb. 1, 2013, and entitled "Evaluation and Rectification System," the entirety of which are hereby incorporated by reference herein.

BACKGROUND OF THE INVENTION

This disclosure relates in general, but not by way of limitation, to directed learning as within a Learning Management System (LMS), Online Homework System (OHS), and/or any other similar educational features, systems, or components such as, for example, a virtual learning environment (VLE) and a learning content management system (LCMS).

The advancement of a student through learning material is directed by a syllabus of curricula that organizes learning materials into a hierarchical structure. A syllabus divides subject areas into topics and divides those topics into learning objectives. The syllabus creates a rigid learning structure that outlines a single path for progressing through the learning material encompassed by the syllabus. Although syllabi have been used for a long time, new methods, techniques, and systems for directing learning are required.

BRIEF SUMMARY OF THE INVENTION

In one embodiment, the present disclosure provides a method for generating learning DNA. The learning DNA can be the aggregate of generated and/or collected information for a gamer. This information can be generated and/or received via gamer inputs, via gamer interaction with an evaluation and rectification system, and/or from aggregators of information relating to the gamer. In one embodiment, the generation of learning DNA can include generating a gamer account, requesting gamer information such as, for example, the gamer age, gamer learning style, gamer knowledge and/or developed skills, and/or grade level, identifying and receiving information from sources of gamer information, and receiving mission information, which mission information can relate to mission started by the gamer, missions completed by the gamer, and the/or to the degree of success with which the gamer completed the mission. In some embodiments, the generation of the learning DNA can further include associating the above-mentioned information with the gamer account.

In one embodiment, the present disclosure relates to a method of providing a customized mission to a gamer. This can include generating learning DNA including a gamer age, a gamer education level, gamer subjects, and past mission results for the gamer. In some embodiments, the learning DNA can be generated by requesting information from the gamer, which requested information can include information about the gamer such as, for example, the gamer age, the gamer education level, gamer subjects, and/or past mission results for the gamer, and information identifying a source of information about the gamer. In some embodiments, the source of information about the gamer can be, for example, any source of information relating to the gamer. This can include, for example, a source of education related information, a source of health related information, a source of demographic information, a source of economic information, and/or a source of personal information. In some embodiments, generating the learning DNA can include receiving information from the gamer, which information received from the gamer can include information identifying a source of information about the gamer and information about the gamer, which can include, for example, the gamer age; and the gamer education level. In some embodiments, generating the learning DNA can include querying the identified source of information about the gamer for gamer information. In some embodiments, the source of information can include one of a social network, a learning management system, an education institute, a source of an online profile, a source of medical records, and a source of public records. Generating the learning DNA can include receiving information from the identified source of information about the gamer, and storing the received information. In some embodiments, the method of providing a customized mission to a gamer can include selecting a mission having a subject matter corresponding to an aspect of the learning DNA.

In one embodiment, the present disclosure relates to a system for providing a customized mission to the gamer. The system can include memory storing a plurality of missions and memory that can store the learning DNA. The system can include a processor that can, generate learning DNA including a gamer age, a gamer education level, gamer subjects, and the gamer's past mission results. The learning DNA can be generated by requesting information from the gamer, which requested information can include information about the gamer and information identifying a source of information about the gamer, receiving information from the gamer, which information received from the gamer can include information identifying a source of information about the gamer and information about the gamer, the information about the gamer including at least one of: the gamer age; and the gamer education level. The learning DNA can be generated by querying the identified source of information about the gamer for gamer information, which source of information can include one of a social network, a learning management system, an education institute, a source of an online profile, a source of medical records, and a source of public records. The learning DNA can be generated by receiving information from the identified source of information about the gamer, and directing the information received from the gamer and from the identified source of information about the gamer to the memory that can store the learning DNA. In some embodiments, the processor of the system can select a mission, which mission can encompass subject matter corresponding to an aspect of the learning DNA.

In some embodiments, the present disclosure relates to a method of customizing a mission. The method can include identifying a gamer, identifying a gamer age and a gamer grade level, retrieving a database of subjects, which database can include information identifying a plurality of subjects and information identifying a plurality of conditions indicating the applicability of the subject to one or several categories of gamers, identifying a sub-group of the plurality of subjects identified in the database, which subgroup can be identified according to at least one of: the gamer age, the gamer grade level, and the gamer identification. The method can include receiving an input identifying one of the sub-group of the plurality of subjects, the identified one of the sub-group of the plurality of subjects containing a plurality of topics, receiving a database of topics associated with the identified one of the sub-group of the plurality of subjects, receiving an input identifying one of the plurality of topics, the identified one of the plurality of topics containing subject matter, generating an evaluation, the evaluation including a plurality of questions relating to at least portions of the subject matter, and providing a mission to a gamer based on gamer responses to the evaluation.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
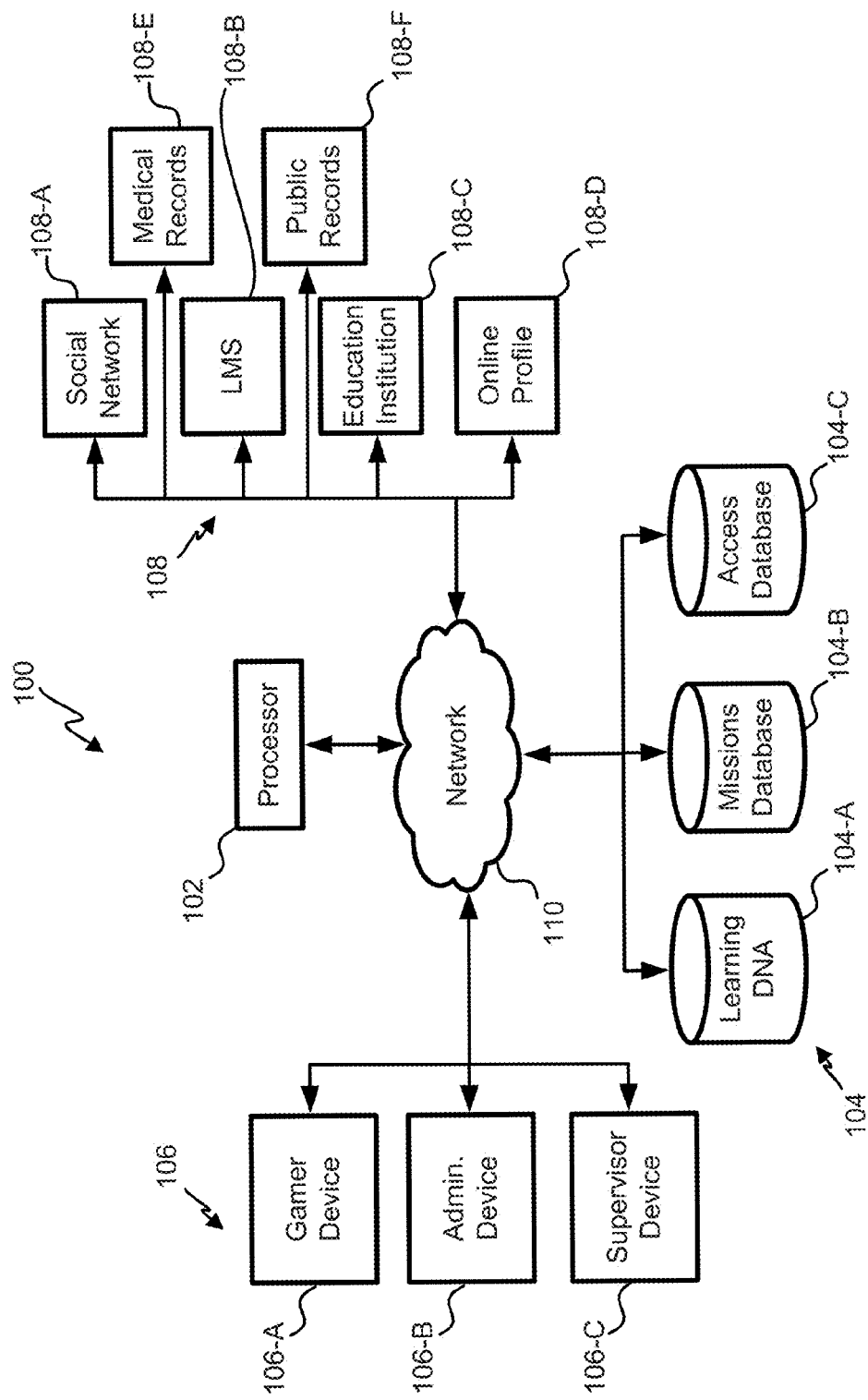
FIG. 1 depicts a block diagram of an embodiment of embodiment of an evaluation and rectification system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides an evaluation and rectification system including a processor, one or several databases, one or several user devices, and one or several data aggregators. The evaluation and rectification system collects information from the one or several user devices and from the one or several data aggregators and generates learning DNA based on the collected data. The learning DNA is used to select a mission customized to the gamer.

In one embodiment, the present disclosure provides a method for customizing a mission to a gamer area for learning improvement. The method can include, for example, receiving information identifying the gamer's learning level, a subject, a topic within the subject, and the subtopic within the topic. The method can include generating an assessment questionnaire including a plurality of questions associated with aspects of the subtopic, receiving gamer provided answers to the questions of the assessment questionnaire, and providing a mission to the gamer based on the correctness of the gamer provided answers.

In one embodiment, the present disclosure provides a method for customizing a mission to optimize the gamer's learning. The method can include, for example, receiving an indicator of the gamer's preferred learning style, providing a first mission to the gamer, the first mission being selected to match the gamer's indicated preferred learning style, providing a second mission to the gamer, the second mission being selected to not match the gamer's indicated preferred learning style, and comparing the results of the first mission and the second mission to generate an indicator of the relative effectiveness of the preferred learning style and the non-preferred style. The method can include, for example, providing a third mission to the gamer, the third mission being selected to match the relatively more effective of the learning styles.

With reference now to FIG. 1, a block diagram of one embodiment of an evaluation and rectification system 100 is shown. The evaluation and rectification system 100 aggregates data relating to a gamer, and specifically to a gamer's level of study, a gamer's comprehension level, and/or the gamer's learning style. The evaluation and rectification system 100 can use the aggregated data to generate one or several missions. In some embodiments, for example, the missions can be used to generate further gamer data to thereby identify areas of desired improvement in the gamer's comprehension level, to identify areas of satisfactory and/or excellent gamer comprehension, and/or to identify the relative effectiveness of different learning styles. In some embodiments, for example, the missions can contribute to increasing the gamer's level of study, the gamer's comprehension level, and/or to increase the effectiveness of gamer learning styles.

The evaluation and rectification system 100 can include a processor 102. The processor 102 can provide instructions to and receive information from the other components of the evaluation and rectification system 100. The processor 102 can act according to stored instructions, which stored instructions can be located in memory associated with the processor and/or in other components of the evaluation and rectification system 100. The processor 102 can comprise a microprocessor, such as a microprocessor from Intel® or Advanced Micro Devices, Inc.®, or the like.

The evaluation and rectification system 100 can include one or several databases 104. The one or several databases 104 can comprise stored data relevant to the functions of the evaluation and rectification system 100. The one or several databases 104 can include a learning DNA database 104-A. The learning DNA database 104-A can include learning DNA associated with a user such as, for example, a gamer. This learning DNA can include, for example, any information relating to the gamer, the gamer's level of education, the gamer's educational needs, a gamer area for learning improvement, any of the gamer's learning abilities and/or disabilities, learning styles, including, for example, preferred learning styles, and the relative effectiveness of different learning styles, and/or any gamer demographic information. The learning DNA can be received from the gamer, from a non-gamer user of the evaluation and rectification system 100, and/or from other components of the evaluation and rectification system 100. In some embodiments, for example, the learning DNA can be static in that it is not updated after its generation, and in some embodiments, for example, the learning DNA can be dynamic in that it is updated after its initial generation. The learning DNA can be used by the evaluation and rectification system 100 to select missions for gamer.

The one or several databases 104 can include a missions database 104-B. The missions database 104-B can include information relating to one or several missions. The missions can include activities configured to teach a gamer information, to teach a gamer a skill, to ascertain a gamer's mastery of some information and/or skill, to provide practice relating to material, to determine the effectiveness of one or several learning styles, to introduce the gamer to a new learning style, and/or to increase the ability of the gamer to learn with the learning style. The activities can include watching a video, listening to a lecture, reading material, receiving training, participating in an assessment such as a test or a quiz, and/or the like. In some embodiments, for example, the missions can include an audio component, a visual component, tactile component, an interactive component, text, one or several questions, one or several questions and answers, one or several tests, and/or one or several quizzes.

In some embodiments, for example, the missions can include a gaming component. The gaming component can include, for example, the award of points for the completion of the mission, for the completion of a portion of a mission, for the demonstrated mastery of the subject matter of a mission, or for correctly answering one or several questions associated with the mission. In some embodiments, for example, the gaming component can include, a storyline, an opponent, a protagonist, one or several tools and/or weapons, one or several abilities and/or skills, and/or a disposition based on the gamer performance such as, for example, winning and/or losing.

The evaluation and rectification system 100 can include an access database 104-C. The access database 104-C can include security information to secure access to the evaluation and rectification system 100 and filter information provided by the evaluation and rectification system 100.

In some embodiments, for example, the access database can comprise login information. This information can include, for example, information identifying a user such as, for example, a username and password, or a user identification number. In some embodiments, for example, when a user desires to access the evaluation and rectification system 100, the user can be prompted to enter identification information such as, for example, a username and password. After the user provides the identification information, the evaluation and rectification system 100 can verify the identification information, and specifically, the processor 102 can compare the user provided identification information to information stored within the access database to determine if the current user is an authorized user.

In some embodiments, after the processor 102 has determined whether the user is an authorized user, the processor 102 can determine the user's access level. In some embodiments, for example, this determination can include querying the access database 104-C for access information associated with the user provided identification information. In some embodiments, for example, the access level can correspond to the portions of the learning DNA database 104-A that the user can access such as, for example, limiting a gamer's access of the learning DNA database 104-A to accessing their own learning DNA. In some embodiments, for example, the access level can correspond to portions of the missions database 104-B that a user can access such as, for example, allowing a gamer to access missions corresponding to their subscription level, corresponding to their grade level, and/or corresponding to any other factor, and in some embodiments, the access level can correspond to allowing an administrator to access all or portions of the evaluation and rectification system 100 including the missions database 104-B to provide updates and maintenance to the evaluation and rectification system 100 and/or to some or all of the missions in the missions database 104-B.

In some embodiments, for example, information stored within the access database 104-C can be used to filter and/or limit learning DNA provided to the user device 106 such as, for example, the supervisor device 106-C and/or to one or several of the data aggregators. In some embodiments, for example, the access database 104-C can include information identifying a supervisor associated with the gamer such as, for example, one or more of gamer's parents and/or teachers. The evaluation and rectification system 100 can use this information to provide information updating the supervisor on the gamer's status and/or progress within the evaluation and rectification system 100. In some embodiments, for example, information from the access database 104-C can be used to limit information transmitted to the supervisor such as, for example, eliminating the gamer address, gamer medical records, and/or any other desired information. In some embodiments, for example, a similar filtration of provided learning DNA can be performed before any portion of the learning DNA is transmitted to one or more of the data aggregators 108.

The evaluation and rectification system 100 can include one or several user devices 106, which can include, a gamer device 106-A, an administrator device 106-B, and/or a supervisor device 106-C. The user devices 106 allow a user, including a gamer, a parent, and/or an educator, including a teacher and/or an administrator, to access the evaluation and rectification system 100. This access can be in the form of the gamer receiving missions from the evaluation and rectification system 100, the gamer providing information to the evaluation and rectification system 100, the gamer providing answers to the evaluation and rectification system 100, the gamer receiving an evaluation and/or indicator of progress within a mission and/or level of mastery of the subject matter of the mission, an administrator receiving information indicative of the functioning of the evaluation and rectification system 100, the administrator providing updates and/or maintenance to the evaluation and rectification system 100, a supervisor such as, for example, a parent, a teacher, and/or a counselor receiving information from the evaluation and rectification system 100 indicative of gamer actions within the evaluation and rectification system 100 and/or the evaluation of gamer actions within the evaluation and rectification system 100. The details and function of the user devices 106 will be discussed at greater length in reference to FIG. 1A below.

The evaluation and optimization system 100 can include one or several data aggregators 108. The data aggregators 108 can include any electronic information source, and can specifically, be a source of information relating to the gamer. In some embodiments, the data aggregators 108 can be a source of education related information, of health related information, of demographic information, and/or of personal information. The data aggregators 108 can be, for example, a social network 108-A, a learning management system (LMS) 108-B, and education institution 108-C such as, for example, a school that the gamer is currently attending, will be attending, and/or has attended, an online profile 108-D such as, for example, a gaming profile, a media consumption profile, or any other profile of the gamer's habits, preferences, friends, or behavior, a source of medical records 108-E including, for example, information relating to any gamer disability including a learning disability and/or any gamer mental health issue, and/or public records 108-F including, for example, information relating to where the gamer lives. In some embodiments, for example, one or several of the data aggregators 108 can be an active part of the evaluation and rectification system 100 in that one or several of the data aggregators can receive all or portions of the learning DNA from the evaluation and rectification system 100, as well as provide information relating to the gamer to the evaluation and rectification system 100. In some embodiments, for example, one or several of the data aggregators 108 can be a passive part of the evaluation and rectification system 100 in that the one or several of the data aggregators do not receive all or portions of the learning DNA from the evaluation and rectification system 100. In some embodiments, a data aggregator 108 is an active part of the evaluation and rectification system 100 when the data aggregator receives information relating to the gamer from the evaluation and rectification system 100, and the data aggregator 108 is a passive part of the evaluation and rectification system 100 when the data aggregator 108 does not receive information relating to the gamer from the evaluation and rectification system 100.

The evaluation and rectification system 100 can include a network 110. The network 110 allows communication between the components of the evaluation and rectification system 100. The network 110 can be, for example, a local area network (LAN), a wide area network (WAN), a wired network, wireless network, a telephone network such as, for example, a cellphone network, the Internet, the World Wide Web, or any other desired network. In some embodiments, the network 110 can use any desired communication and/or network protocols.

Figure 1A:
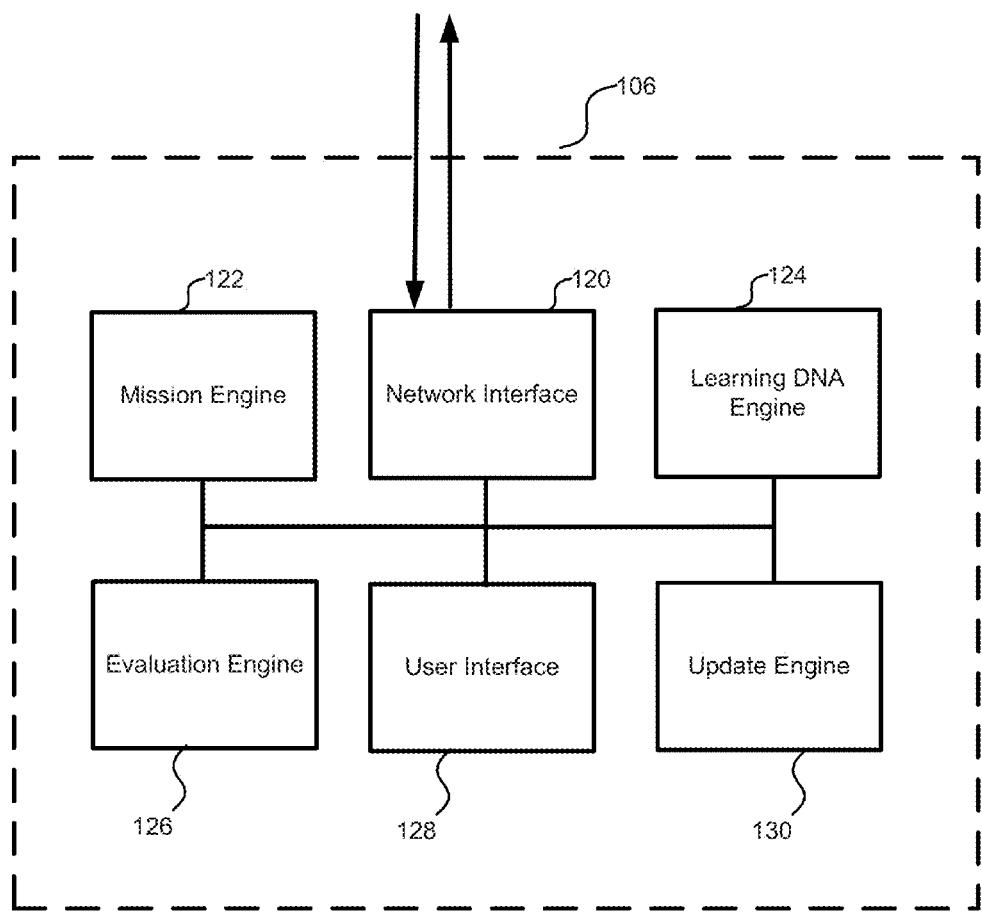
FIG. 1A depicts a schematic illustration of an embodiment of a user device.

With reference now to FIG. 1A, a block diagram of one embodiment of a user device 106 is shown. As discussed above, the user device 106 can be configured to provide and/or receive information to other components of the evaluation and rectification system 100. The user device can access the evaluation and rectification system 100 through any desired means or technology, including, for example, a webpage such as, for example, a social network service page, or a web portal. As depicted in FIG. 1A, the user device 106 can include a network interface 120. The network interface 120 allows the user device 106 to access the other components of the evaluation and rectification system 100, and specifically allows the user device 106 to access the network 110 of the evaluation and rectification system 100. The network interface can include features configured to send and receive information, including, for example, an antenna, a modem, a transmitter, receiver, or any other feature that can send and receive information. The network interface 120 can communicate via telephone, cable, fiber-optic, or any other wired communication network. In some embodiments, the network interface 120 can communicate via cellular networks, WLAN networks, or any other wireless network.

The user device 106 can include, for example, a mission engine 122. The mission engine 122 can receive mission data from the mission database 104-B of the evaluation and rectification system 100, and can provide the mission to the gamer. In some embodiments, for example, the mission engine 122 can include, a video player, an audio player, and/or any other software used to provide the mission to the gamer.

The user device 106 can include a learning DNA engine 124. The learning DNA engine 124 can receive user inputs including information for inclusion in the learning DNA database 104-A, and can specifically receive gamer inputs. The learning DNA engine 124 can evaluate the user device 106 for information, including gamer information for inclusion in the learning DNA database 104-A. this evaluation can include identification of the user's online activities and retrieval of information associated with these online activities. In some embodiments, for example, the learning DNA engine 124 can evaluate the user device 106 for information, including gamer information identifying data aggregators 108 possessing information relating to the gamer, and can be further configured to provide any collected information either from the user device 106 or from the user, such as the gamer, to the network interface 124 providing to the other components of the evaluation and rectification system 100.

The user device 106 can include an evaluation engine 126. The evaluation engine 126 can receive user and/or gamer inputs provided as part of the mission, and determine the correctness and/or incorrectness of those inputs. In some embodiments, for example, the evaluation engine 126 can receive answer data to questions asked as part of the mission. This answer data can then be used by the evaluation engine 126 to correct answers provided by the gamer in response to mission questions, and to provide the gamer with an evaluation of the mission outcome. In some embodiments, for example, the evaluation engine 126 can be configured to provide information relating to the evaluation of the mission outcome to the network interface 120, which provides the information relating to the evaluation of the mission outcome to the other components of the evaluation and rectification system 100, and specifically to the learning DNA database 104-A.

The user device 106 can include a user interface 202 that communicates information to, and receives inputs from a user. The user interface 128 can include a screen, a speaker, a monitor, a keyboard, a microphone, a mouse, a touchpad, a keypad, or any other feature or features that can receive inputs from a user and provide information to a user.

The user device 106 can include an update engine 130. The update engine can be used, for example, by an administrator to update a portion of the evaluation and rectification system 100, and specifically to provide maintenance to the evaluation and rectification system 100 and/or to update all or portions of the missions database 104-B including, for example, the updating of one or several of the missions.

Figure 2:
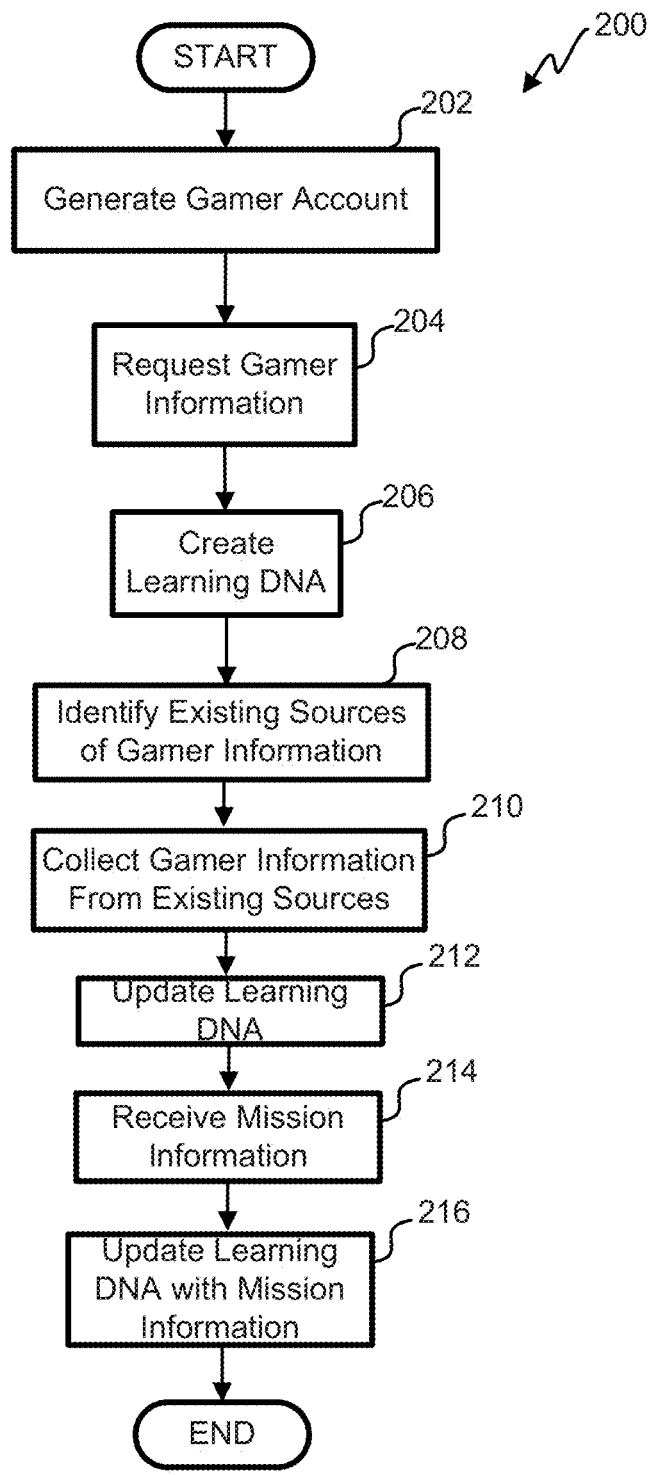
FIG. 2 is a flowchart illustrating one embodiment of a process for generating learning DNA.

With reference now to FIG. 2, a flowchart illustrating one embodiment of a process 200 for generating learning DNA is shown. The process begins at block 202 wherein a gamer account is generated. The gamer account can include identification information to allow the gamer to login to the evaluation and rectification system 100. Information relating to the gamer account can be stored in the learning DNA database 104-A.

After the gamer account is generated, the process 200 proceeds to block 204 wherein gamer information is requested. In some embodiments, for example, the request for gamer information can include, for example, prompting the gamer to answer questions relating to, for example, the gamer's name, age, grade level, past, current, and/or future classes, past and/or current grades, preferred learning style, or any other desired information relating to the gamer. In some embodiments, for example, the gamer can enter the gamer information via the learning DNA engine 124. In some embodiments, for example, the learning DNA engine can provide the gamer information to the network interface 120, which network interface 120 can communicate the gamer information to the other components of the evaluation and rectification system 100 via the network 110.

After the gamer information is requested, the process 200 proceeds to block 206 wherein the learning DNA is created. In some embodiments, for example, the learning DNA can be created from the gamer information received from the user device 106. Specifically, in some embodiments, the learning DNA can be created by normalizing and organizing the gamer information. The learning DNA can be created by the processor 102

After the learning DNA is created, the process 200 proceeds to block 208 wherein existing sources of gamer information are identified. In some embodiments, for example, existing sources of gamer information can be identified by prompting the gamer to identify existing sources of gamer information. In some embodiments, for example, existing sources of gamer information can be identified by the learning DNA engine 124 searching the user device 106 for information, including gamer information for inclusion in the learning DNA database 104-A. In some embodiments, for example, the learning DNA engine 124 can evaluate the user device 106 for information, including gamer information identifying data aggregators 108. In some embodiments, for example, the learning DNA engine can provide the existing sources of gamer information to the network interface 120, which can then provide the information to the other components of evaluation and rectification system 100 via the network 110. In some embodiments, for example, this information can be stored in the learning DNA database 104-A.

After the existing sources of gamer information are identified, the process 200 proceeds to block 210 wherein the gamer information is collected from the existing sources of gamer information. In some embodiments, for example, these existing sources of gamer information can include, for example, the data aggregators 108. In some embodiments, the evaluation and rectification system 100 can be linked with the one or several data aggregators 108 and/or can be integrated into one or several of the data aggregators 108. In such an embodiment, for example, a secure link and/or securable link between the data aggregators 108 of the other components of the evaluation and rectification system 100 can be established. In some embodiments, for example, the secure link can be established using known secure communication protocols so as to allow the verification of the source of any information request and the source of any information provided.

In some embodiments, for example, the processor 102 can, after establishing a secure connection with one or several of the data aggregators 108, request information relating to the gamer from the one or several data aggregators 108. In some embodiments, for example, this request can include identification information for the gamer to allow the data aggregator 108 to identify the subject to the query and an indicator of the type of information being requested.

After gamer information has been collected from existing sources such as, for example, the data aggregators 108, the process 200 proceeds to block 212 wherein the learning DNA is updated. In some embodiments, for example, the learning DNA can be updated with gamer information collected from the existing sources. In some embodiments, the gamer information can be formatted and normalized so as to allow its incorporation into the learning DNA. In some embodiments, for example, the gamer information collected from the existing sources can be organized in formatted by the processor 102, and can be stored in the learning DNA database 104-A.

After the learning DNA has been updated, the process 200 proceeds to block 214 wherein mission information is received. In some embodiments, for example, mission information can include information relating to a mission outcome and/or to a requested or completed mission. In some embodiments, for example, this mission information can identify the subject of the mission, which subject of the mission can comprise a plurality of topics, the topic of the subject of the mission, which topic can comprise a plurality of subtopics, the subtopic of the topic of the mission, or any desired description of the information contained in the mission. In some embodiments, the subtopic of the topic of the mission can be further divided and/or subdivided as desired to provide a desired level of granularity of the content of a mission. In some embodiments, for example, the mission information can include an indicator as to whether the mission was completed. In some embodiments in which the mission was completed, the mission information can include an indicator of the outcome of a mission, such as, for example, a gamer's mission score, an indicator of the subject matter of correct answers, an indicator of the subject matter of incorrect answers, or an indicator of subject matter that should be repeated.

After the mission information is received, the process 200 proceeds to block 216 wherein the learning DNA is updated with the mission information. In some embodiments, for example, the mission information can be can be formatted and normalized so as to allow its incorporation into the learning DNA. In some embodiments, for example, the mission information can be organized in formatted by the processor 102, and can be stored in the learning DNA database 104-A.

Figure 3:
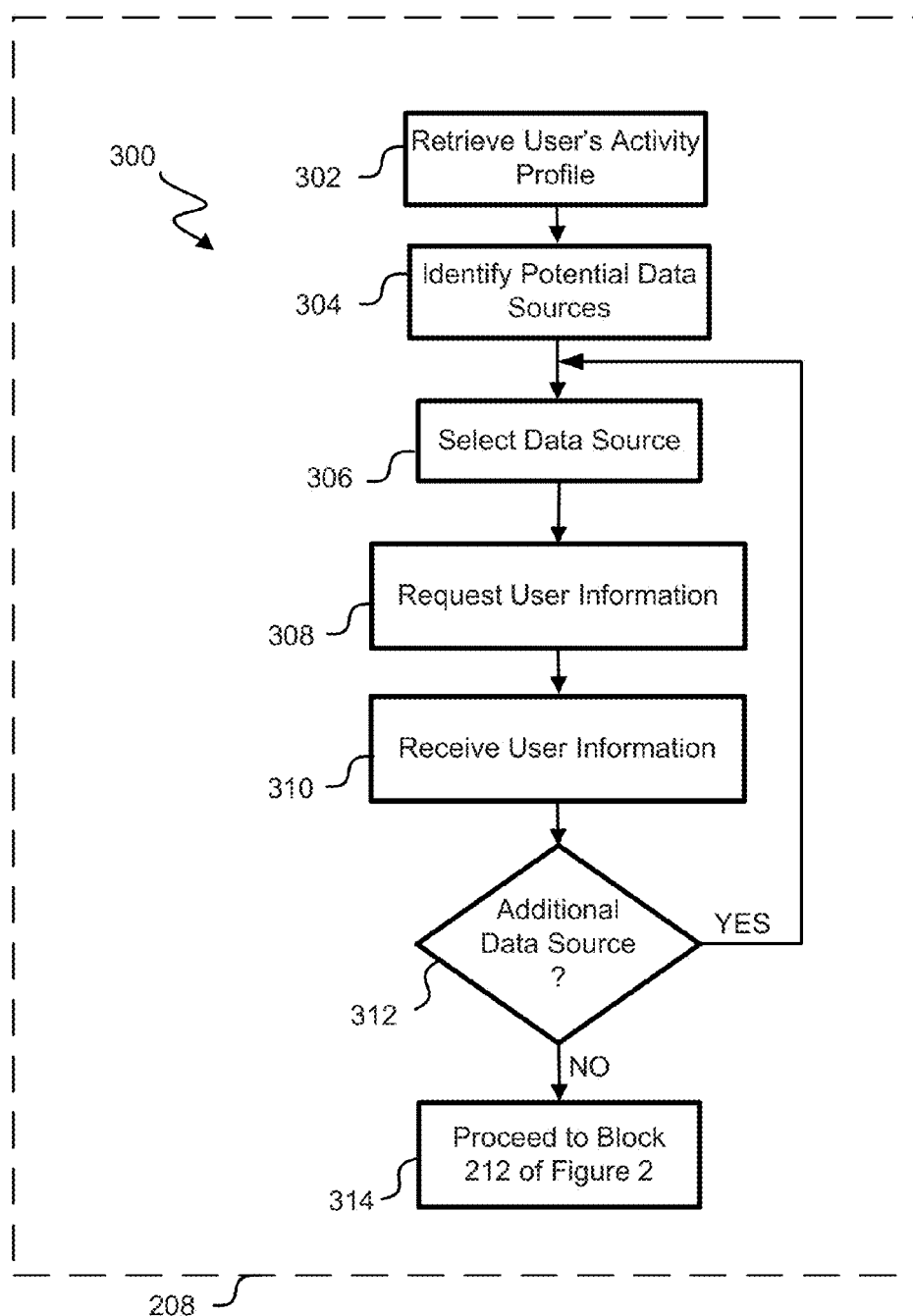
FIG. 3 is a flowchart illustrating one embodiment of a process for retrieving gamer information.

With reference now to FIG. 3, a flowchart illustrating one embodiment of a process 300 for retrieving gamer information is shown. In some embodiments, the process 300 can be performed in the place of block 208 and/or block 210 of FIG. 2. The process 300 can be performed by the evaluation and rectification system 100 and/or by a component thereof.

The process 300 begins at block 302 wherein the user's activity profile is retrieved. In some embodiments, the user's activity profile can identify user activities on the user device 106 including, for example, the gamer device 106-A and/or on a device other than the user device 106 that is utilized by the user to access the Internet and/or websites. In some embodiments, the user's activity profile can comprise the user's browsing history and/or any other record of Internet usage and/or websites visited by the user. In some embodiments, this information can be retrieved from a web cache of an Internet browser on the user device 106 and/or on another device. In one embodiment, for example, in which this information is retrieved from the user device 106, the user's activity profile can be found within the network interface 120.

After the user's activity profile has been retrieved, the process 300 proceeds to block 304 wherein potential data sources are identified. In some embodiments, this identification can be performed by the processor 102 of the evaluation and rectification system 100 and/or by a component of the user device 106. In some embodiments, this identification can include searching the information from the web cache for an indication of websites to which the gamer provided information and with which the gamer had frequent and/or regular contact. In some embodiments, for example, this identification can further include identifying known data sources such as, for example, social media websites and/or webpages, educational websites and/or webpages, discussion forums, medical service provider websites and/or webpages, and the like.

In some embodiments, the identification of potential data sources 108 can include adding of information relating to the potential data sources 108 to a database 104. In some embodiments, this information can include an identification of a potential data source 108, and in some embodiments can include an identification of a communication pathway with the potential data source 108. In some embodiments, the communication pathway can be the communication protocol, communication channel, communication process, and/or the like by which the evaluation and rectification system 100 can provide information to, and receive information from the data source 108. In some embodiments, the communication pathway can include one or several of encryption and/or identification protocols to allow for the verification of the identity of the evaluation and rectification system 100 and to protect the transmission of information from the data source 108.

After potential data sources 108 have been identified, the process 300 proceeds to block 306 wherein a data source 108 is selected. In some embodiments, the data source 108 can be selected by the processor 102 of the evaluation and rectification system 102 and/or by a component of the user device 106. In some embodiments, the data source 108 can be selected from the database containing the identification of potential data sources 108. In some embodiments, the data source 108 can be selected based on any desired factor including, for example, the likelihood of the data source 108 containing desired gamer information, the ease with which the data source 108 can be accessed, reliability of the data source 108, the level of security of the data source 108, and/or the ordering of the data sources 108 within the database. In one embodiment, for example, the selected data source 108 can be the first data source within the database.

After the data source 108 is selected, the process 300 proceeds to block 308 wherein user information is requested from the data source 108. In some embodiments, for example, the user information can be requested from the data source 108 by the processor 102 and/or by another component of the evaluation and rectification system 100, and the information can be requested via the network 110. In some embodiments, user information can be requested from the data source 108 via the communication pathway.

After the user information has been requested, the process 300 proceeds to block 310 wherein the user information is received. In some embodiments, the user information can be received via the network 110 and can be received by, for example, the processor 102. In some embodiments, after the user information has been received and/or has been requested, a binary value can be added to the database of data sources, and can be associated with the relevant data source 108, which value can indicate that user information has been requested and/or has been received from the associated data source 108.

After the user information has been received, the process 300 proceeds to decision state 312 wherein it is determined if there is an additional data source 108 in the database of data sources from which user information has not been requested and/or has not been received. In some embodiments, this determination can include review of the database of data sources to determine if any of the data sources 108 contained within the database are not associated with the value indicative of the request for and/or receipt of user information from a data source 108. If it is determined that there are no additional data sources 108, then the process 300 proceeds to block 314 and continues to block 212 of FIG. 2. If it is determined that there are additional data sources 108, then the process 300 returns to block 306 and continues with process 300 as discussed above.

Figure 4:
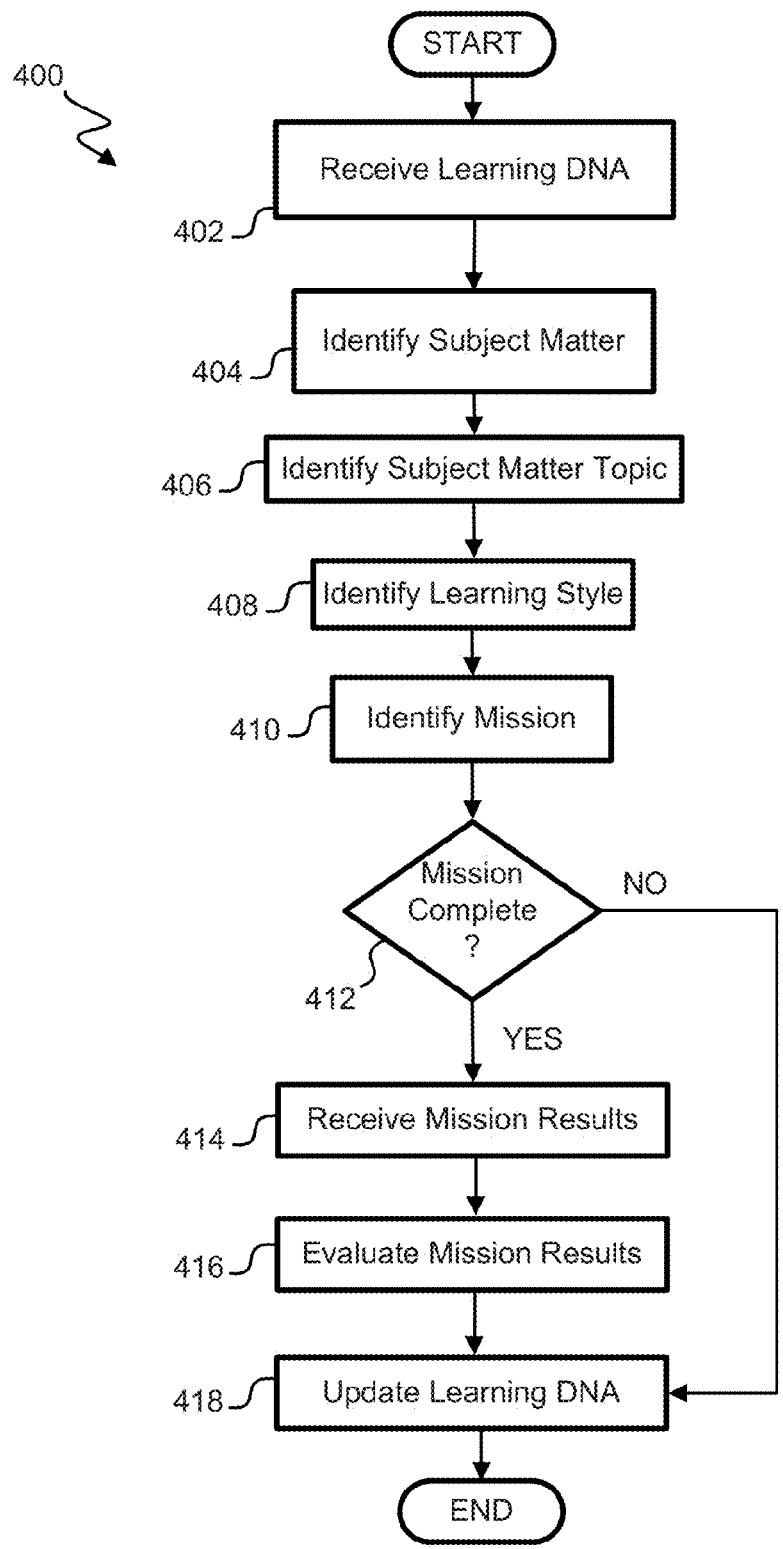
FIG. 4 is a flowchart illustrating one embodiment of a process for updating learning DNA based on mission results.

With reference now to FIG. 4, a flowchart illustrating one embodiment of a process 400 for recommending a mission is provided. The process begins at block 402 wherein the learning DNA is received. In some embodiments, for example, the learning DNA can be received from the learning DNA database 104-A.

After the learning DNA is received, the process 400 proceeds to block 404 wherein the subject matter is identified. In some embodiments, for example, the subject matter defines a group of related information. In some embodiments, for example, the subject matter can correspond to a course of study such as, for example, United States history, European history, physics, chemistry, biology, math, algebra, trigonometry, advanced algebra, calculus, or any other course of study.

In some embodiments, for example, the subject matter can be identified based on information contained within the learning DNA. Thus, for example, the learning DNA can include a prioritized list of subject matters. This listing generated based on a variety of factors including, for example, gamer input indicating a prioritization, current, past, and/or planned gamer courses, and/or current and/or past gamer grades. In some embodiments, for example, the subject matter can be identified based on a gamer selection of the subject matter.

After the subject matter is identified, the process 400 proceeds to block 406 wherein the subject matter topic is identified. In some embodiments, for example, the subject matter topic is a group of related information within the subject. In some embodiments, for example, the subject matter topic can correspond to a topic within a course of study such as, for example, the Civil War, the 60's, the Cold War, or World War II within United States history or differential calculus or integral calculus within calculus.

In some embodiments, for example, the subject matter topic can be identified based on information contained within the learning DNA. Thus, for example, the learning DNA can include a prioritized list of subject matter topics. This listing can be generated based on a variety of factors including, for example, gamer input indicating a prioritization, current, past, and/or planned gamer courses, and/or current and/or past gamer grades. In some embodiments, for example, the subject matter topic can be identified based on a gamer selection of the subject matter topic.

After the subject matter topic is identified, the process 400 proceeds to block 408 wherein the learning style is identified. In some embodiments, for example, the learning style represents a format of learning and/or teaching such as, for example, visual, aural, verbal, physical, logical, social, or solitary. In some embodiments, for example, the learning style can be identified based on information contained within the learning DNA. Thus, for example, the learning DNA can include information relating to the gamers preferred learning style or the relative effectiveness of different learning styles for the gamer. In some embodiments, for example, the learning style can be based on the gamer's preferred learning style and/or the learning style that is most effective for the gamer. In some embodiments, the learning style can be identified based on a gamer input.

After the learning style has been identified, the process 400 proceeds to block 410 wherein the mission is identified. As discussed above, the missions can include activities configured to teach a gamer some information, to teach a gamer a skill, to ascertain a gamer's mastery of some information and/or skill, to determine the effectiveness of one or several learning styles, to introduce the gamer to a new learning style, and/or to increase the ability of the gamer to learn with the learning style. The mission can be identified, for example, based on the learning DNA, and specifically based on the identified subject matter, the identified subject matter topic, and the identified learning style. In some embodiments, the mission can be identified from one or several missions stored within the missions database 104-B, and in some embodiments, the mission can be identified from one or several missions stored in other components of the evaluation and rectification system 100 such as, for example, the LMS 108-B and/or the education institution 108-C.

After the mission has been identified, the process proceeds to decision state 412 wherein it is determined if the gamer has completed the mission. In some embodiments, for example, the evaluation and rectification system 100 can receive an indicator of a mission been completed. In some embodiments, for example, the indication can be provided by the mission engine 122 to the evaluation and rectification system 100. In some embodiments, for example, this indication can be stored as part of the learning DNA database 104-A.

If it is determined that the mission is complete, the process 400 proceeds to block 414 wherein the mission results are received. In some embodiments, for example, the mission results can be received by the evaluation and rectification system 100 from the user device 106. In some embodiments, the mission results can be received from the mission engine 122 and/or the evaluation engine 126 via the network interface 120 of the user device 106.

After the mission results are received, the process 400 proceeds to block 416 wherein the mission results are evaluated. In some embodiments, for example, the mission results can be evaluated by the evaluation engine 126 of the user device 106, and in some embodiments, the mission results can be evaluated by the processor 102 of the evaluation and rectification system 100. In some embodiments, for example, the mission results can be evaluated by both the evaluation engine 126 of the user device 106 and the processor 102 of the evaluation and rectification system 100. The mission results can be evaluated to determine the correctness and/or incorrectness of the gamer provided answers. In some embodiments, for example, the mission data can be evaluated to determine aspects of the mission that the gamer has mastered, aspects of the mission that the gamer should repeat, and/or a score for the mission.

After the mission results have been evaluated, and with reference again to decision state 412 if it is determined that the mission is not complete, the process 400 proceeds to block 418 wherein the learning DNA is updated. In some embodiments, for example, the learning DNA can be updated with the mission results, and/or with information indicating that the mission was not completed. The learning DNA can be updated within the learning DNA database 104-A.

Figure 5:
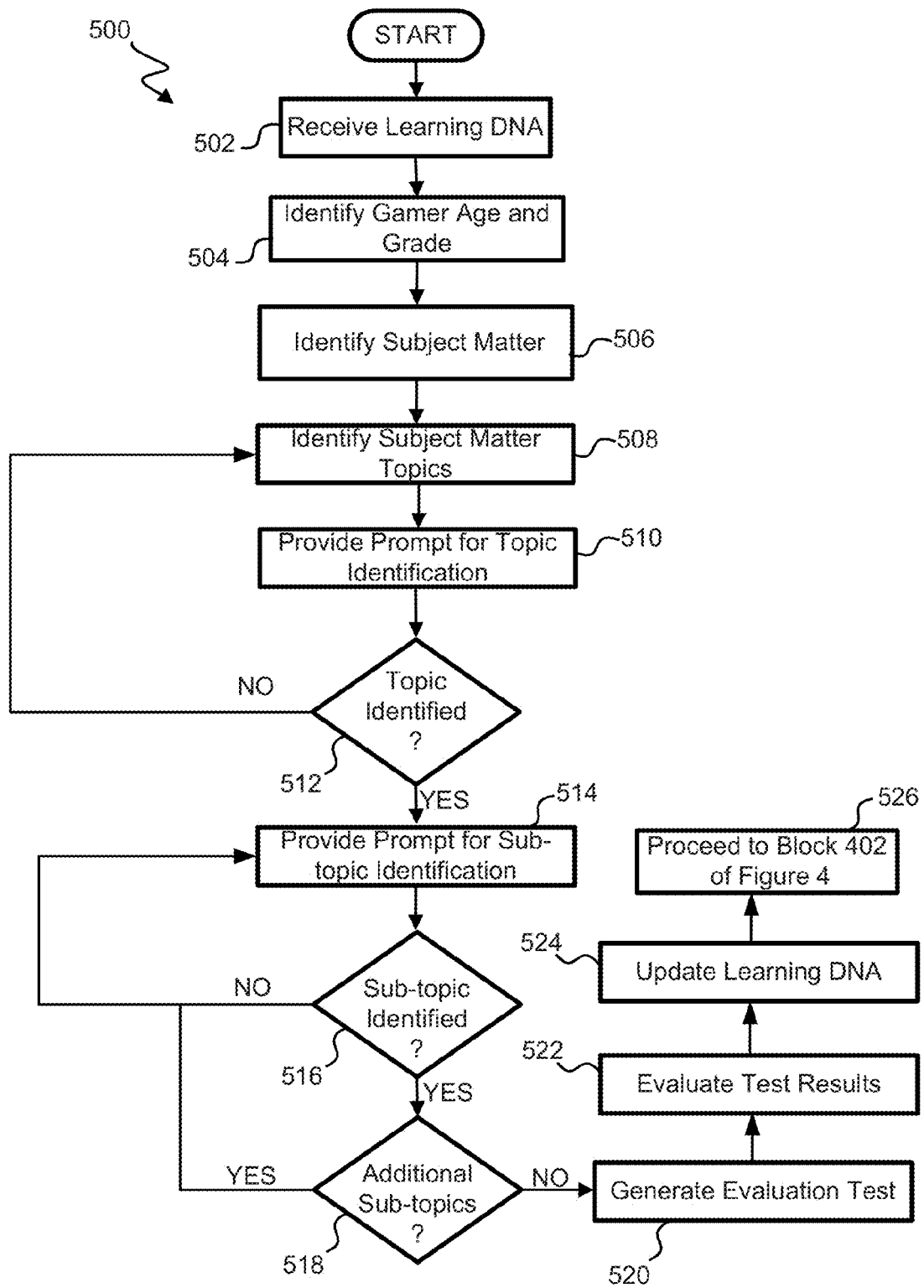
FIG. 5 a flowchart depicting one embodiment of a process for operating a recommendation engine to recommend a mission.

With reference now to FIG. 5, a flowchart depicting one embodiment of a process 500 for identifying mission subject matter is depicted. In some embodiments, the process 500 can be used upon the creation of a new gamer account, and/or in the event of the existence of a gamer account lacking all and/or substantial portions of the learning DNA. The process 500 begins in block 502 wherein the learning DNA is received. In some embodiments, for example, the learning DNA can be received from the learning DNA database 104-A.

After the learning DNA has been received, the process proceeds to block 504 wherein the gamer age and grade is identified. In some embodiments, for example, the gamer's age and grade can be identified by requesting and receiving information from the gamer. In some embodiments, for example, the processor 102 can send a request to the learning DNA engine 124 of the user device 106 for the gamer age and grade information. The learning DNA engine 124 can request gamer age and grade information from the gamer via the user interface 128. In such an embodiment, the received gamer age and grade information can be returned to the processor 102 via the network interface 120 of the user device 106. In some embodiments, the gamer age and grade information can be stored in the learning DNA database 104-A.

After the gamer age and grade has been identified, the process 500 proceeds to block 506 wherein the subject matter is identified. In some embodiments, the subject matter can be identified the of the receipt of a gamer input identifying the subject matter. In some embodiments, the identification of the subject matter can include retrieving a database of subjects. In some embodiments, for example, the processor 102 can send a request to the learning DNA engine 124 of the user device 106 for subject matter information. In some embodiments, for example, the learning DNA engine 124 can request subject matter information from the gamer via the user interface 128, and can return the received subject matter information to the processor 102 via the network interface 120 of the user device 106. In some embodiments, the gamer identified subject matter can be stored in the learning DNA database 104-A.

In some embodiments, the databases of subjects can include information identifying a plurality of subjects and/or information identifying a plurality of conditions indicating the applicability of the subject to one or several categories of gamers. In one embodiment, for example, the conditions indicating the applicability of the subject one or several categories of gamers can identify criteria, which criteria can be contained in the learning DNA, which indicate the applicability of the subject to a gamer. These criteria can identify, for example, an age of the gamer, a grade level the gamer, completed missions of the gamer, and/or the like. In some embodiments, a subgroup of the plurality of subjects in the database can be identified according to one or several of the criteria. In some embodiments, this subgroup of subjects can be the subgroup of subjects identified is relevant to a gamer based on portions and/or aspects of the learning DNA. In some embodiments, for example, this subgroup can be identified according to at least one of the age of the gamer, the grade level of the gamer, the gamer identification, and/or any other information contained within the learning DNA.

In some embodiments, the subgroup of subjects can be provided to the user via the user device 106, and specifically via the user interface 128. In some embodiments, the providing of the subgroup of subjects can further include the providing of a prompt to the user to select and/or identify one of the subgroup of subjects. In some embodiments, the process 500 can include receiving an input identifying one of the subgroup of the plurality of subjects. In some embodiments, this identified one of the subgroup of the plurality of subjects can contain one or several topics.

After the subject matter has been identified, the process 500 proceeds to block 508 wherein subject matter topics are identified. In some embodiments, for example, subject matter topics can be identified by querying the missions database 104-B for the subject matter topics included in the subject matter. In some embodiments, for example, identifying the subject matter topics can further comprise identifying gamer prompts providing an indication of the subject matter topic.

After the subject matter topics have been identified, the process 500 proceeds to block 510 wherein a prompt for topic identification is provided. In some embodiments, for example, the prompt for topic identification can be provided to the gamer via the learning DNA engine 124 of the user device 106 and the user interface 128 of the user device 106. In some embodiments, for example, the user device 106 can provide the gamer with an indicator of subject matter topics that can, for example, be a name of the subject matter topic and/or a portion of the content of the subject matter topic. In some embodiments, for example, the indicator of the subject matter topic can be accompanied with the question as to whether the gamer desires a mission related to the indicated subject matter topic. In some embodiments, the providing of a prompt for topic identification can further include receiving a user input identifying a selected topic and/or one of the plurality of topics provided to the user. In some embodiments, this input can be received via the user interface 128 of the user device 106.

After the prompt for topic identification is provided, the process 500 proceeds to decision state 512 wherein it is determined whether the topic is identified. In some embodiments, the topic can be identified by a gamer response to the prompt for topic identification. If the gamer response indicates of the subject matter topic of the prompt is not the correct and/or the desired subject matter topic, then the subject matter topic has not been identified, and the process 500 returns to block 508.

If the gamer response indicates that the subject matter topic of the prompt is the correct subject matter topic, then the subject matter topic has been identified and the process 500 proceeds to block 514 wherein a prompt is provided for subtopic identification. In some embodiments, for example providing a prompt for subtopic identification can include identifying the subtopic. In some embodiments, for example, subtopic can be identified by querying the missions database 104-B for the subtopics included in the subject matter topic of the subject matter. In some embodiments, for example, identifying the subtopic can further include identifying gamer prompts providing an indication of the subject matter topic.

In some embodiments, for example, providing the prompt for subtopic identification can include providing a prompt to the gamer via the learning DNA engine 124 of the user device 106 and the user interface 128 of the user device 106. In some embodiments, for example, the user device 106 can provide the gamer with an indicator of the subtopic that can, for example, be a name of the subtopic and/or a portion of the content of the subtopic. In some embodiments, for example, the indicator of the subtopic can be accompanied with the question as to whether the gamer desires a mission related to the indicated subtopic.

After the prompt for subtopic identification is provided, the process 400 proceeds to decision state 516 wherein it is determined whether the subtopic is identified. In some embodiments, the subtopic can be identified by a gamer response to the prompt for subtopic identification. If the gamer response indicates that the subtopic of the prompt is not the correct and/or desired subtopic, then the subtopic has not been identified, and the process 500 returns to block 514.

If the gamer response indicates that the subtopic of the prompt is the correct subtopic, then the subtopic has been identified in the process 500 proceeds to decision state 518 wherein it is determined if there are additional subtopics. In some embodiments, for example, determining whether there are additional subtopics can include querying the missions database 104-B for information indicating whether the subtopics are divided into further subtopics. If the subtopics are divided into further subtopics, then the process 500 returns to block 514.

If the subtopics are not divided into further subtopics, then the process 500 proceeds to block 520 wherein an evaluation test is generated. In some embodiments, for example, the evaluation test can comprise a plurality of questions relating to the information of the identified subtopic. In some embodiments, for example, the plurality of questions of the evaluation test can broadly encompass all or a portion of the information contained in the identified subtopic. In some embodiments, for example, the plurality of questions can be unrelated except that they all pertain to information within the subtopic, and in some embodiments, the plurality of questions and/or some of the plurality of questions can be related in that an incorrect answer can lead to a plurality of questions configured to identify the reason why they gamer provided an incorrect answer to the initial question.

After the evaluation test has been generated, the process 500 proceeds to block 522 wherein the test results are evaluated. In some embodiments, for example, the test results can be evaluated by the evaluation engine 126 of the user device, and in some embodiments, for example, the test results can be evaluated by the processor 102 of the evaluation and rectification system 100. In some embodiments, for example, the evaluation of the test results can provide an indication of the portions of the information of the subject matter that the gamer has mastered and/or has not mastered.

After the test results of been evaluated, the process 500 proceeds to block 524 wherein the learning DNA is updated. In some embodiments, for example, the learning DNA can be updated with the results of the evaluation of the test results. In some embodiments, for example, the learning DNA can be updated in the learning DNA database 104-A. after the learning DNA has been updated, the process 500 proceeds to block 526 and proceeds to block 502 of FIG. 5.

Figure 6:
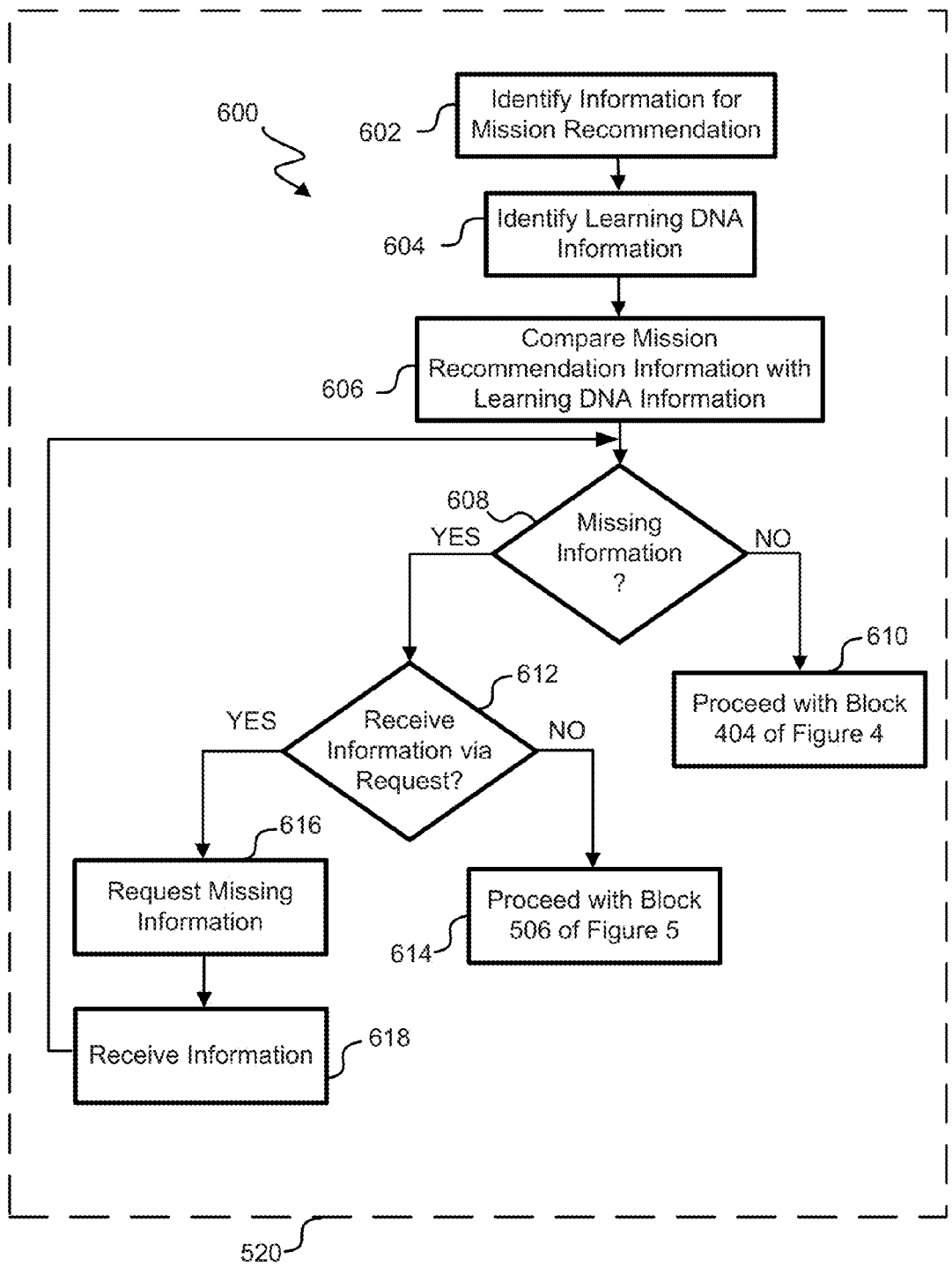
FIG. 6 is a flowchart depicting one embodiment of a process for identifying information desired for making a mission recommendation.

With reference now to FIG. 6, a flowchart illustrating one embodiment of a process 600 for identifying information desired for making a mission recommendation is shown. In some embodiments, the process 600 can be used to identify information used by the evaluation and rectification system 100 in recommending a mission and in identifying if any of this identified information is absent and/or missing from the learning DNA. The process 600 can be performed in the place of block 504 of FIG. 5. In some embodiments, the process 600 can be performed by the evaluation and rectification system 100 and/or by a component thereof.

The process 600 begins in block 602 wherein information for mission recommendation is identified. In some embodiments, this information can include an identification of the types and/or categories of information used in making a mission recommendation. In some embodiments, the types and/or categories of information used in making a mission recommendation can match and/or correspond to the types of information stored and/or captured in learning DNA, and can, in some embodiments, be coterminous with the types of information stored and/or captured in the learning DNA.

In some embodiments, some of the types and/or categories of information used in making a mission recommendation can be more or less useful and/or important in making the mission recommendation. Similarly, some of the types of information stored and/or captured in the learning DNA can be more or less useful in making a mission recommendation. In some embodiments, the identification of information for mission recommendation can include identifying the relative importance of the types and/or categories of information used in making omission recommendation.

In some embodiments, this information can be retrieved from the learning DNA database 104-A and/or one of the other databases 104. In some embodiments, the identification of information permission recommendation can be performed by the processor 102.

After information for mission recommendation has been identified, the process 600 proceeds block 604 wherein the information contained within the learning DNA is identified. In some embodiments, for example, this can include identifying the actual information contained within the learning DNA. In some embodiments, this information can be retrieved from the learning DNA database 104-A. For further distinction between the information identified in block 602 and the information identified in block 604 of FIG. 6, the information identified in block 602 of FIG. 6 is the identification of the type of information used and/or useful in making a mission recommendation, whereas the information identified in block 604 of FIG. 6 is the actual information contained within the learning DNA of a gamer.

After the learning DNA information has been identified, the process 600 proceeds to block 606 wherein the information for mission recommendation is compared with the learning DNA information. In some embodiments, this comparison can identify portions of information used and/or useful in making mission recommendation that is/are not contained in and/or are inadequately contained in the learning DNA. In some embodiments, a first indicator can be added to the types and/or categories of information used in making a mission recommendation that are missing or absent from, and/or are inadequately present in the learning DNA, and in some embodiments, a second indicator can be added to the types and/or categories of information used in making mission recommendation that are found and/or are adequately found in the learning DNA. In some embodiments, the first and second indicators can be Boolean indicators, the second indicator corresponding to a "true" condition, and the first indicator corresponding to a "false" condition. In some embodiments, these indicators can be stored within one of the databases 104 including, for example, the learning DNA database 104-A and/or the missions database 104-B.

After information for mission recommendation is compared with the learning DNA information, the process 600 proceeds to decision state 608 wherein it is determined if any information is missing. In some embodiments, this can include retrieving indicators stored within one of the databases 104, and determining which of the types and/or categories of information used and/or useful in mission recommendation are associated with the first indicator, which first indicator indicates that the corresponding information is missing from and/or is inadequately present in the learning DNA. If it is determined that none of the information used and/or useful in making a mission determination is missing from the learning DNA, then the process 600 proceeds to block 610 and continues with block 404 of FIG. 4.

If it is determined that at least one of the types and/or categories of information used and/or useful in making a mission determination is missing from and/or is inadequately present in the learning DNA, then the process 600 proceeds to decision state 612 wherein it is determined if the missing information can be received from the gamer, such as, for example, received in response to a request for information. In some embodiments, for example, the missing information can be information that the gamer can know and can reliably provide. In some embodiments, this information can include, for example, the gamer's age, the gamer's address, the gamer's grade level, and/or the like. If it is determined that the missing information cannot be received via request, then the process 600 proceeds to block 614 and continues with block 506 of FIG. 5.

If it is determined that the missing information can be received from the gamer in response to a request for more information, then the process 600 proceeds to block 616 wherein the missing information is requested. In some embodiments, this request can comprise an identification of the missing information and a prompt to the gamer to provide the missing information. In some embodiments, this request can be performed by the evaluation and rectification system 100, and specifically by the user interface 128 of the user device 106.

After the missing information has been requested, the process 600 proceeds to block 618 wherein the requested information is received. In some embodiments, this information can be received via a component of the evaluation and rectification system 100 such as, for example, the user interface 128 of the user device 106. After the requested information has been received, the process 600 returns to decision state 608 and continues as outlined above.

Figure 7:
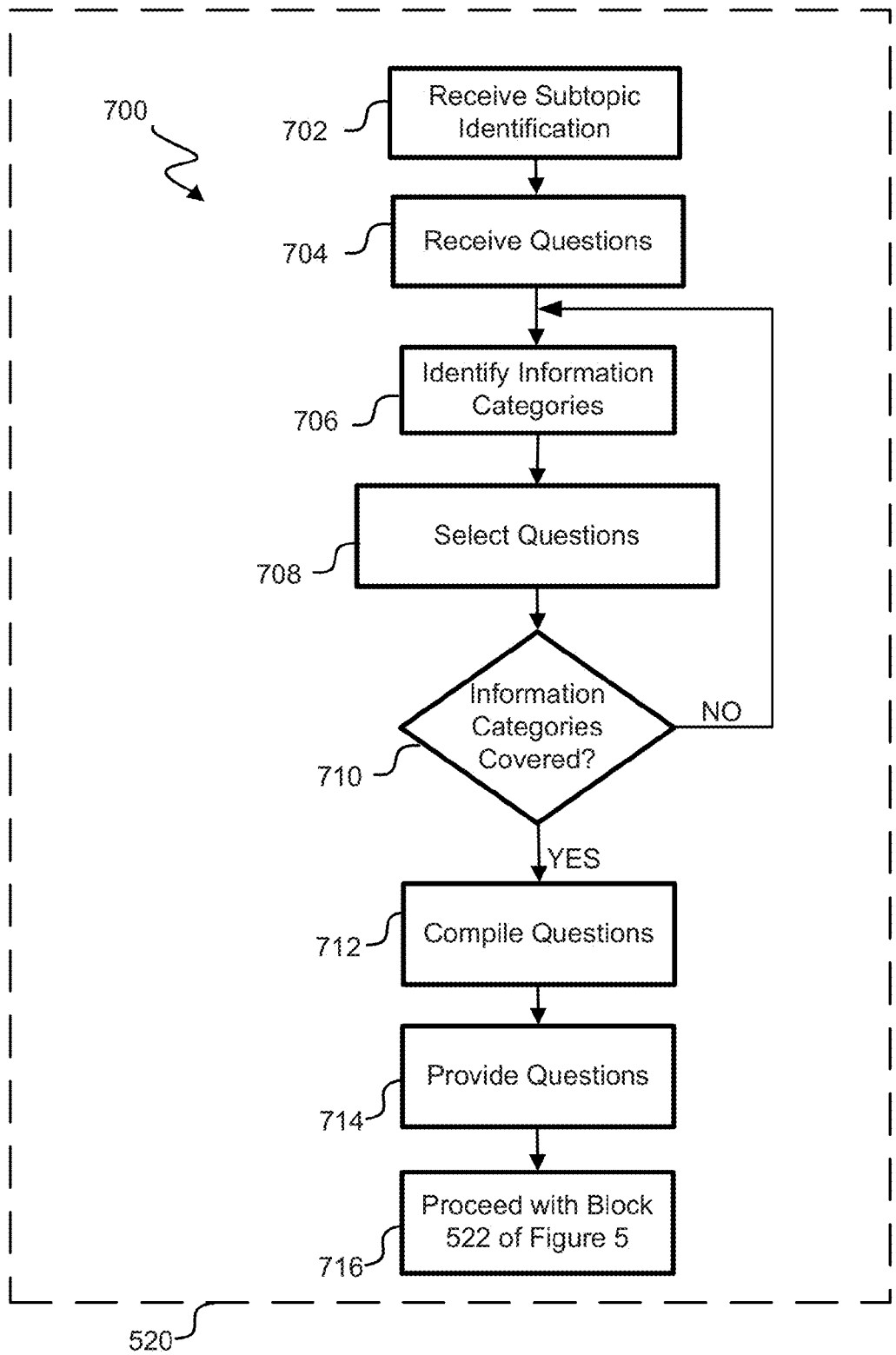
FIG. 7 is a flowchart illustrating one embodiment of a process for generating an evaluation.

With reference now to FIG. 7, flowchart illustrating one embodiment of a process 700 for generating an evaluation is shown. The process 700 can be performed in the place of block 520 of FIG. 5. In some embodiments, the process 700 can be performed by the evaluation and rectification system 100 and/or by a component thereof.

The process 700 begins at block 702 wherein a subtopic identification is received. In some embodiments, the subtopic can comprise a group of material, a plurality of which subtopics can form a topic. In some embodiments, the identification of the subtopic can be performed in 514 of FIG. 5. After the subtopic identification has been received, the process 700 proceeds to block 704 wherein questions associated with the subtopic are received. In some embodiments, these questions can be received from a component of the evaluation and rectification system 100 including, for example, one of the databases 104, one of the user devices 106, and/or one of the data sources 108.

After the questions have been received, the process 700 proceeds to block 706 wherein information categories are identified within the identified subtopic. In some embodiments, these information categories can correspond to the content of the one or several missions associated with the subtopic. In some embodiments, these information categories can be stored within one of the databases 104 such as, for example, the missions database 104-B.

After the information categories have been identified, the process 700 proceeds to block 708 wherein questions corresponding to the information categories are selected. In some embodiments, for example, one or several of the received questions can correspond to one or several of the information categories. In some embodiments, however, fewer than all of the received questions can be used in the creation of an evaluation, and thus, some subset of the received questions can be selected. In some embodiments, this subset can be selected based on the details of, for example, the gamer's learning DNA. In some embodiments, this subset can be identified by the application of a first indicator to selected questions and the second indicator to questions that are not selected. In some embodiments, these indicators can be stored in one of the databases 104 such as, for example, the missions database 104-B.

After the questions have been selected, the process 700 proceeds to decision state 710 wherein it is determined if the identified information categories are adequately covered by the selected questions. In some embodiments, for example, this can include determining whether one or several questions has been selected for some or all of the identified information categories. If it is determined that not all of the information categories are covered and/or are not adequately covered, then the process 700 returns to block 706.

If it is determined that all the information categories are covered and/or are adequately covered, then the process 700 proceeds to block 712 wherein the questions are compiled. In some embodiments, this can include, determining which of the received questions have been selected, and grouping the selected questions together into a single database. In some embodiments, this compilation can include the retrieval of indicators stored within one of the databases 104, and an identification of questions associated with the first indicator.

After the questions of been compiled, the process 700 proceeds to block 714 wherein the questions are provided to the gamer. In some embodiments, for example, this can include providing the compiled questions to the gamer via the user device 106, and specifically via the user interface 128 of the user device 106. After the questions have been provided to the user, the process 700 proceeds to block 716 and continues with block 522 of FIG. 5.

Figure 8:
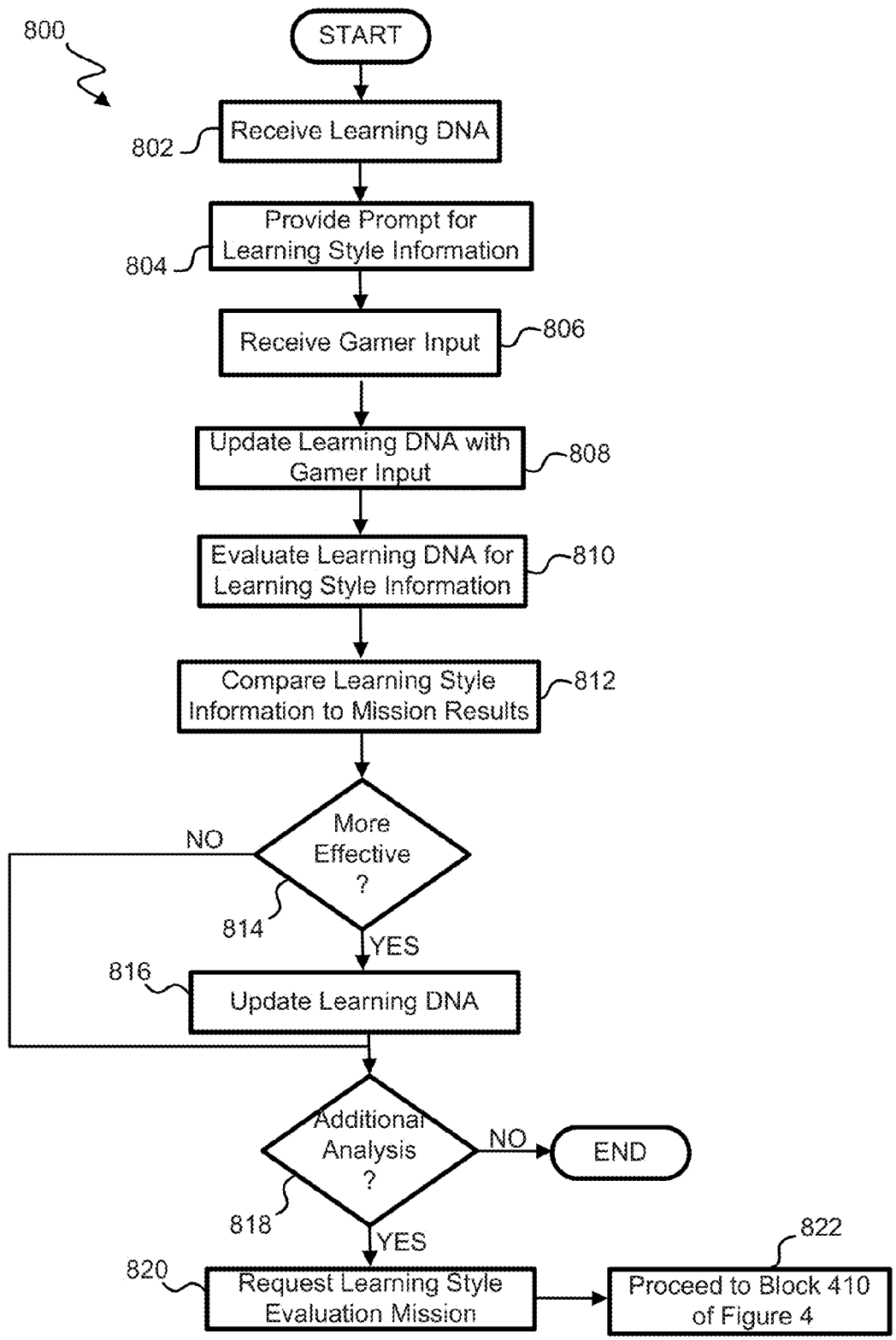
FIG. 8 is a flowchart illustrating one embodiment of a process for identifying learning style.

With reference now to FIG. 8, a flowchart illustrating one embodiment of a process 800 for identifying a learning style is depicted. The process 800 begins in block 802 where the learning DNA is received. In some embodiments, for example, the learning DNA can be received from the earning DNA database 104-A.

After the learning DNA has been received, the process 800 proceeds to block 804 wherein a prompt is provided for learning style information. In some embodiments, for example, the prompt for learning style information can be provided to the gamer via the learning DNA engine 124 of the user device 106 and/or the user interface 128 of the user device 106. In some embodiments, for example, the user device 106 can provide the gamer with an indicator of learning styles that can be, for example, a name of the learning style and/or an example of the learning style. In some embodiments, for example, the indicator of the learning style can be accompanied with the question as to whether the indicated learning style is the desired and/or preferred learning style.

After the prompt is provided for learning style information, the process 800 proceeds to block 806 wherein gamer input is received. In some embodiments, for example, the gamer input can comprise an indicator of the desired and/or preferred learning style. In some embodiments, for example, the gamer input can be received via the user interface 128 of the user device 106.

After the gamer input is received, the process 800 proceeds to block 808 wherein the learning DNA is updated with the gamer input. In some embodiments, for example, the user interface 128 can provide the gamer input to the network interface 120 which can provide the gamer input to the evaluation and rectification system 100, and specifically to the processor 102 of the evaluation and rectification system 100. In some embodiments, for example, this gamer input can be incorporated into the learning DNA and the learning DNA database 104-A can be updated.

After the learning DNA has been updated with the gamer input, the process 800 proceeds to block 810 wherein the learning DNA is evaluated for learning style information. In some embodiments, the learning DNA can include an indicator of the preferred and/or relatively more effective learning style. In some embodiments, this indicator can be stored in the learning DNA in the learning DNA database 104-A. In some embodiments, for example, the evaluation of the learning DNA for learning style information can include retrieving the learning DNA from the learning DNA database 104-A and retrieving the indicator of the preferred and/or relatively more effective learning style from the learning DNA by, for example, the processor 102.

After the learning DNA has been evaluated for learning style information, the process 800 proceeds to block 812 wherein the learning style information is compared to any received mission results. In some embodiments, the mission results can include the effectiveness of a learning style in leading to the gamer's mastery of the information associated with the mission. In some embodiments, for example, the gamer can be given a mission for the purpose of ascertaining the effectiveness of a learning style. In such an embodiment, a non-preferred learning style may be incorporated into the mission, and the relative effectiveness of the non-preferred learning style can be ascertained by comparing the evaluation the mission results to the evaluation of mission results for missions incorporating the preferred learning style.

After the learning style information is compared to mission results, the process 800 proceeds to decision state 814 wherein it is determined if the gamer preferred learning style or the non-preferred learning style associated with the gamer completed mission is more effective. If it is determined that the learning style associated with the gamer completed mission is more effective than they gamer preferred learning style, then the process 800 can proceed to block 816 wherein the learning DNA can be updated to indicate the more effective learning style. In some embodiments, for example, the learning DNA can be updated in the learning DNA database 104-A.

After the learning DNA has been updated, or if it is determined at decision state 814 that the gamer preferred learning style is more effective than the learning style associated with the gamer completed mission, then the process 800 proceeds to decision state 818 wherein it is determined if additional learning style analysis will be performed. In some embodiments, for example, additional learning style analysis can be performed to evaluate the effectiveness of further learning styles. If it is determined that additional analysis will not be performed, then the process in terminate.

If it is determined that additional analysis will be performed, the process 800 proceeds to block 820 wherein an additional learning style evaluation mission is requested. In some embodiments, the learning style evaluation mission can be configured to allow the evaluation of the effectiveness of a previously non-evaluated learning style and/or to allow the further collection of data relating to a previously evaluated learning style. After the additional learning style evaluation is requested, the process 800 proceeds to block 822 and proceeds to block 410 of FIG. 4.

Figure 9:
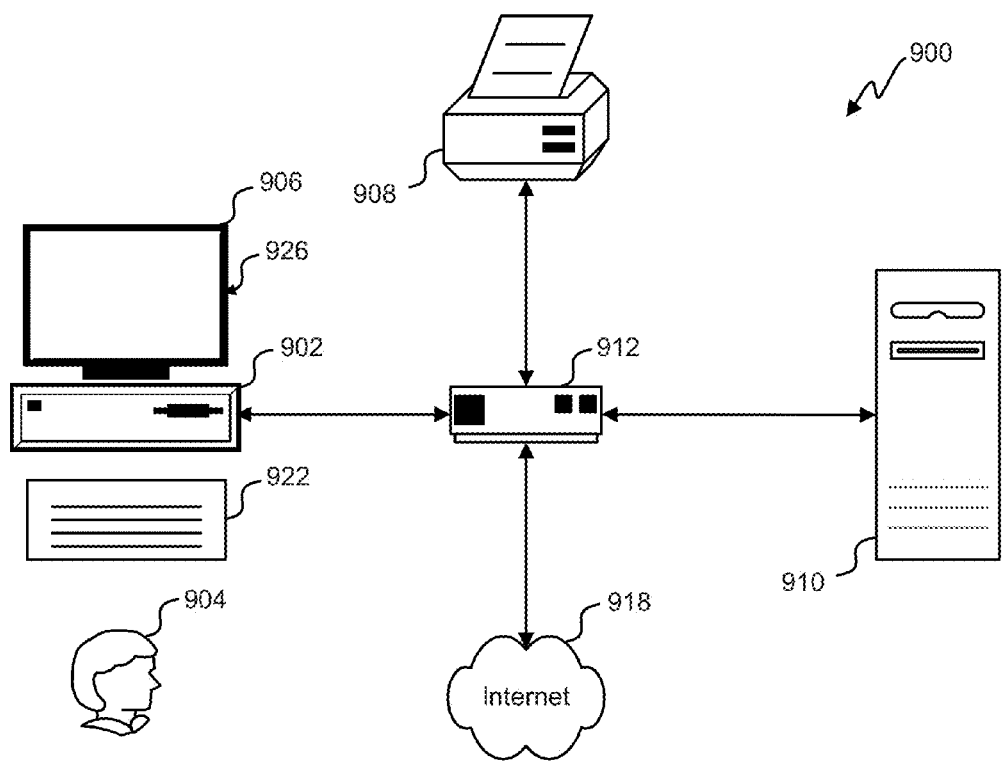
FIG. 9 depicts a block diagram of an embodiment of a computer system.

With reference now to FIG. 9, an exemplary environment with which embodiments may be implemented is shown with a computer system 900 that can be used by a user 904 as all or a component of the evaluation and rectification system 100. The computer system 900 can include a computer 902, keyboard 922, a network router 912, a printer 908, and a monitor 906. The monitor 906, processor 902 and keyboard 922 are part of a computer system 926, which can be a laptop computer, desktop computer, handheld computer, mainframe computer, etc. The monitor 906 can be a CRT, flat screen, etc.

A user 904 can input commands into the computer 902 using various input devices, such as a mouse, keyboard 922, track ball, touch screen, etc. If the computer system 900 comprises a mainframe, a designer 904 can access the computer 902 using, for example, a terminal or terminal interface. Additionally, the computer system 926 may be connected to a printer 908 and a server 910 using a network router 912, which may connect to the Internet 918 or a WAN.

The server 910 may, for example, be used to store additional software programs and data. In one embodiment, software implementing the systems and methods described herein can be stored on a storage medium in the server 910. Thus, the software can be run from the storage medium in the server 910. In another embodiment, software implementing the systems and methods described herein can be stored on a storage medium in the computer 902. Thus, the software can be run from the storage medium in the computer system 926. Therefore, in this embodiment, the software can be used whether or not computer 902 is connected to network router 912. Printer 908 may be connected directly to computer 902, in which case, the computer system 926 can print whether or not it is connected to network router 912.

Figure 10:
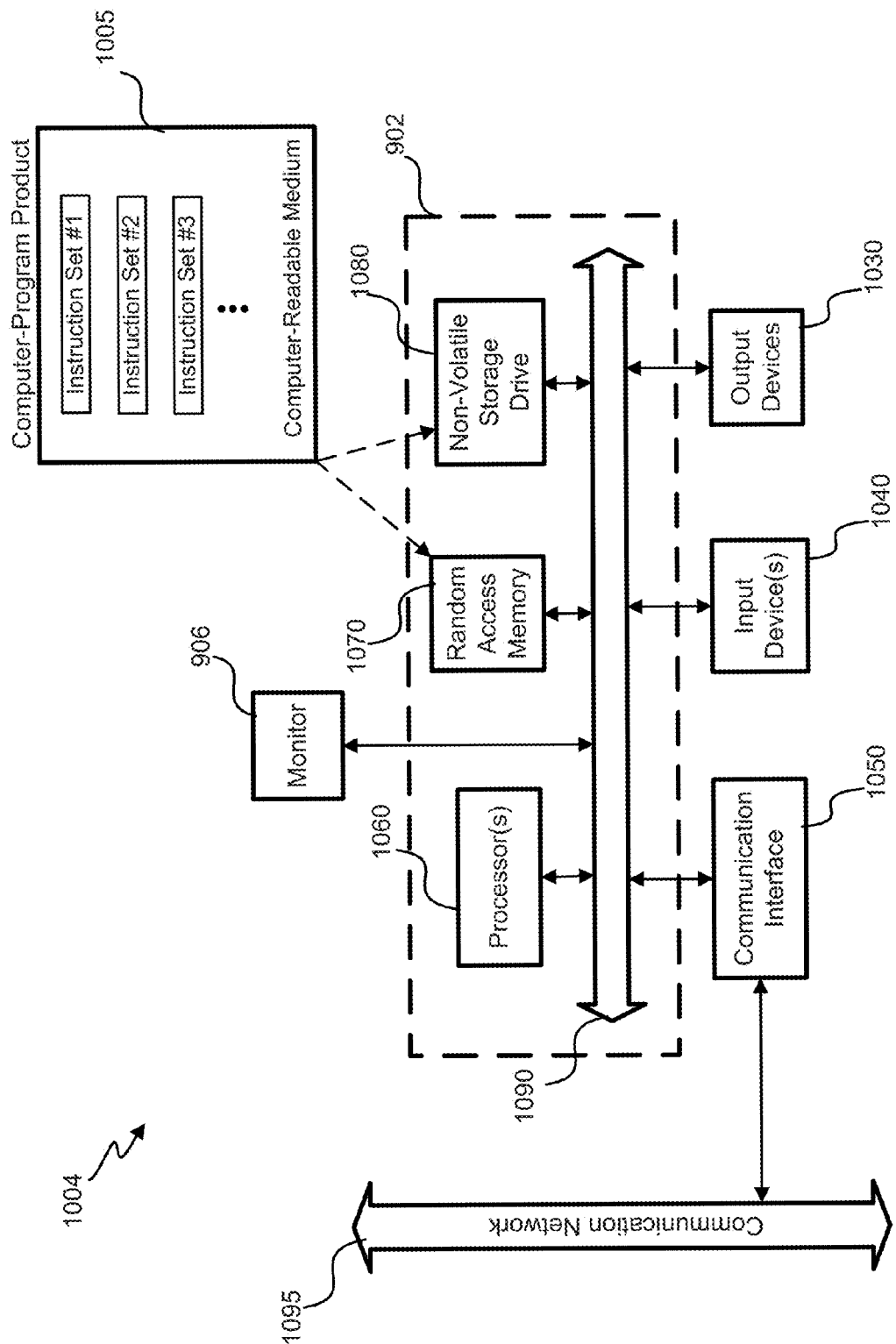
FIG. 10 depicts a block diagram of an embodiment of a special-purpose computer system.

With reference to FIG. 10, an embodiment of a special-purpose computer system 1004 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 926, it is transformed into the special-purpose computer system 1004.

Special-purpose computer system 1004 comprises a computer 902, a monitor 906 coupled to computer 902, one or more additional user output devices 1030 (optional) coupled to computer 902, one or more user input devices 1040 (e.g., keyboard, mouse, track ball, touch screen) coupled to computer 902, an optional communications interface 1050 coupled to computer 902, a computer-program product 1005 stored in a tangible computer-readable memory in computer 902. Computer-program product 1005 directs system 1004 to perform the above-described methods. Computer 902 may include one or more processors 1060 that communicate with a number of peripheral devices via a bus subsystem 1090. These peripheral devices may include user output device(s) 1030, user input device(s) 1040, communications interface 1050, and a storage subsystem, such as random access memory (RAM) 1070 and non-volatile storage drive 1080 (e.g., disk drive, optical drive, solid state drive), which are forms of tangible computer-readable memory.

Computer-program product 1005 may be stored in non-volatile storage drive 1080 or another computer-readable medium accessible to computer 902 and loaded into memory 1070. Each processor 1060 may comprise a microprocessor, such as a microprocessor from Intel® or Advanced Micro Devices, Inc.®, or the like. To support computer-program product 1005, the computer 902 runs an operating system that handles the communications of product 1005 with the above-noted components, as well as the communications between the above-noted components in support of the computer-program product 1005. Exemplary operating systems include Windows® or the like from Microsoft® Corporation, Solaris® from Oracle®, LINUX, UNIX, and the like.

User input devices 1040 include all possible types of devices and mechanisms to input information to computer system 902. These may include a keyboard, a keypad, a mouse, a scanner, a digital drawing pad, a touch screen incorporated into the display, audio input devices such as voice recognition systems, microphones, and other types of input devices. In various embodiments, user input devices 1040 are typically embodied as a computer mouse, a trackball, a track pad, a joystick, wireless remote, a drawing tablet, a voice command system. User input devices 1040 typically allow a user to select objects, icons, text and the like that appear on the monitor 906 via a command such as a click of a button or the like. User output devices 1030 include all possible types of devices and mechanisms to output information from computer 902. These may include a display (e.g., monitor 906), printers, non-visual displays such as audio output devices, etc.

Communications interface 1050 provides an interface to other communication networks 1095 and devices and may serve as an interface to receive data from and transmit data to other systems, WANs and/or the Internet 918. Embodiments of communications interface 1050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1050 may be coupled to a computer network, to a FireWire® bus, or the like. In other embodiments, communications interface 1050 may be physically integrated on the motherboard of computer 902, and/or may be a software program, or the like.

RAM 1070 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1070 and non-volatile storage drive 1080 may be configured to store the basic programming and data constructs that provide the functionality of various embodiments of the present invention, as described above.

Software instruction sets that provide the functionality of the present invention may be stored in RAM 1070 and non-volatile storage drive 1080. These instruction sets or code may be executed by the processor(s) 1060. RAM 1070 and non-volatile storage drive 1080 may also provide a repository to store data and data structures used in accordance with the present invention. RAM 1070 and non-volatile storage drive 1080 may include a number of memories including a main random access memory (RAM) to store of instructions and data during program execution and a read-only memory (ROM) in which fixed instructions are stored. RAM 1070 and non-volatile storage drive 1080 may include a file storage subsystem providing persistent (non-volatile) storage of program and/or data files. RAM 1070 and non-volatile storage drive 1080 may also include removable storage systems, such as removable flash memory.

Bus subsystem 1090 provides a mechanism to allow the various components and subsystems of computer 902 communicate with each other as intended. Although bus subsystem 1090 is shown schematically as a single bus, alternative embodiments of the bus subsystem may utilize multiple busses or communication paths within the computer 902.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of updating learning DNA, the method comprising:
retrieving learning DNA from a learning DNA database, wherein the learning DNA comprises a gamer age, a gamer education level, gamer subjects, and the gamer's past mission results, wherein the gamer subjects include an identification of a group of subject matter that the gamer has mastered and an identification of a group of subject matter that the gamer has partially mastered;
identifying a subject matter from the learning DNA retrieved from the learning DNA database, wherein the subject matter defines a group of related information;
identifying a subject matter topic, wherein the subject matter topic comprises a group of related information within the subject;
retrieving a mission from a mission database, wherein the mission comprises at least one learning activity;
determining if the mission is complete; and
updating the learning DNA in the learning DNA database, wherein updating the learning DNA comprises determining whether the mission was successfully completed, and wherein updating the learning DNA comprises outputting a value indicating whether the mission was successfully completed to the learning DNA database.

2. The method of claim 1, wherein the group of related information corresponds to a course of study.

3. The method of claim 1, wherein the learning DNA comprises a prioritized list of subject matter, and wherein the identified subject matter is selected based on the prioritized list of subject matter.

4. The method of claim 1, wherein the subject matter topic is identified based on information contained in the learning DNA.

5. The method of claim 4, wherein the learning DNA comprises a prioritized list of subject matter topics, and wherein the identified subject matter topic is selected based on the prioritized list of subject matter topics.

6. The method of claim 1, further comprising receiving the mission results, wherein the mission results are received from a user device.

7. A method of identifying a learning style, the method comprising:
retrieving learning DNA from a learning DNA database, the learning DNA comprising a gamer age, a gamer education level, gamer subjects, and the gamer's past mission results, wherein the gamer subjects include an identification of a group of subject matter that the gamer has mastered and an identification of a group of subject matter that the gamer has partially mastered;
receiving an input identifying a learning style;
updating the learning DNA with the identified learning style, wherein updating the learning DNA comprises outputting an update to the learning DNA database;
receiving at least one mission result for at least one completed mission, wherein the mission comprises at least one learning activity, and wherein the mission result indicates the effectiveness of a mission learning style;
comparing the identified learning style and the mission results to determine if the identified learning style corresponds to the mission learning style; and
updating the learning DNA if the identified learning style does not correspond to the mission learning style, wherein updating the learning DNA comprises outputting an update to the learning DNA database.

8. The method of claim 7, wherein the mission results indicate the effectiveness with which one or several learning styles master the at least one activity of the mission.

9. The method of claim 7 further comprising determining to evaluate the effectiveness of a second learning style compared to the identified learning style.

10. The method of claim 9, further comprising selecting a mission to evaluate the effectiveness of the second learning style compared to the identified learning style.

11. The method of claim 7, further comprising selecting a mission having a subject matter corresponding to an aspect of the learning DNA.

12. The method of claim 7, wherein receiving the mission result comprises receiving a plurality of gamer responses corresponding to questions contained in the mission.

13. The method of claim 12, wherein receiving the mission result further comprises:
   identifying correctly answered questions, and
   identifying incorrectly answered questions.

14. A system for identifying a learning style, the system comprising:
   memory storing a plurality of missions and configured to store learning DNA in a learning DNA database; and
   a processor configured to:
      retrieve learning DNA from the learning DNA database, the learning DNA comprising a gamer age, a gamer education level, gamer subjects, and the gamer's past mission results, wherein the gamer subjects include an identification of a group of subject matter that the gamer has mastered and an identification of a group of subject matter that the gamer has partially mastered;
      receive an input identifying a learning style;
      update the learning DNA with the identified learning style, wherein updating the learning DNA comprises outputting an update to the learning DNA database;
      receive at least one mission result for at least one completed mission, wherein the mission comprises at least one learning activity, and wherein the mission result indicates the effectiveness of a mission learning style;
      compare the identified learning style and the mission results to determine if the identified learning style corresponds to the mission learning style; and
      update the learning DNA if the identified learning style does not correspond to the mission learning style, wherein updating the learning DNA comprises outputting an update to the learning DNA database.

15. The system of claim 14, wherein the mission results indicate the effectiveness with which one or several learning styles master the at least one activity of the mission.

16. The system of claim 14 wherein the processor is further configured to determine to evaluate the effectiveness of a second learning style compared to the identified learning style.

17. The system of claim 16, wherein the processor is further configured to select a mission to evaluate the effectiveness of the second learning style compared to the identified learning style.

18. The system of claim 14, wherein the processor is further configured to select a mission having a subject matter corresponding to an aspect of the learning DNA.

19. The system of claim 14, further comprising a user device connected to the processor via a network, wherein the user device is configured to receive a gamer input indicating the identified learning style.

* * * * *